United States Patent
Eggleston et al.

(10) Patent No.: US 8,002,524 B2
(45) Date of Patent: Aug. 23, 2011

(54) WIND TURBINE AERODYNAMIC SEPARATION CONTROL

(75) Inventors: Eric Eggleston, Tehachapi, CA (US); Christopher Wolfe, Niskayuna, NY (US); Eric John Ruggiero, Rensselaer, NY (US); Alexander Simpson, Bavaria (DE); Rodrigo Rodriguez Erdmenger, Bavaria (DE); Robbert Pannekeet, Bavaria (DE)

(73) Assignee: General Electric Company, Schenectady, NY (US)

( * ) Notice: Subject to any disclaimer, the term of this patent is extended or adjusted under 35 U.S.C. 154(b) by 63 days.

(21) Appl. No.: 12/500,648

(22) Filed: Jul. 10, 2009

(65) Prior Publication Data

US 2010/0143118 A1 Jun. 10, 2010

(51) Int. Cl.
*F03D 7/02* (2006.01)
(52) U.S. Cl. ............................. 416/41; 416/61
(58) Field of Classification Search .................. 415/914, 415/47, 48; 416/40, 41, 61
See application file for complete search history.

(56) References Cited

U.S. PATENT DOCUMENTS

| 5,394,488 | A | * | 2/1995 | Fernald et al. ................ 385/13 |
| 6,940,186 | B2 | | 9/2005 | Weitkamp |
| 7,303,373 | B2 | | 12/2007 | Viertl |
| 7,360,996 | B2 | | 4/2008 | Driver |
| 2006/0140760 | A1 | | 6/2006 | Saddoughi et al. |
| 2006/0145483 | A1 | | 7/2006 | Larsen et al. |
| 2008/0317598 | A1 | | 12/2008 | Barbu et al. |
| 2010/0098540 | A1 | * | 4/2010 | Fric et al. ...................... 416/36 |

FOREIGN PATENT DOCUMENTS

| WO | 2008/020239 A1 | 2/2008 |
| WO | 2008/020240 A1 | 2/2008 |
| WO | 2008/020242 A1 | 2/2008 |

* cited by examiner

*Primary Examiner* — Edward Look
*Assistant Examiner* — Dwayne J White
(74) *Attorney, Agent, or Firm* — Sutherland Asbill & Brennan LLP

(57) ABSTRACT

The present application provides a wind turbine system. The wind turbine system may include a number of blades, a number of wind speed sensors positioned on the blades, a controller in communication with the wind speed sensors, and one or more performance adjustment, mechanisms in communication with the controller. The controller activates the performance adjustment mechanisms in response to the wind speed sensors.

13 Claims, 2 Drawing Sheets

WIND TURBINE AERODYNAMIC SEPARATION CONTROL

TECHNICAL FIELD

The present application relates generally to the field of wind turbines and more particularly relates to the use of fiber optic sensors to determine the wind speed along the length of an airfoil blade.

BACKGROUND OF THE INVENTION

Wind turbines are increasingly gaining importance in the area of renewable sources of energy generation. Wind turbine technology is now the basis of large scale power generation applications. Of the many challenges that exist in harnessing wind energy, one challenge is maximizing wind turbine performance while minimizing system loads in given wind conditions. Non-limiting examples of improved wind turbine performance parameters include maximized aerodynamic efficiency, maximized energy output, minimized wind turbine system loads, minimized noise, and combinations thereof. Improvement in these parameters may lead to a minimized cost of energy and other benefits.

One issue in optimizing the performance parameters is flow separation over the wind turbine blades. Flow separation may lead to stall, which is a limiting factor in wind turbine blade design. When stall occurs, lift generated by the blades may decrease significantly and a large component of the torque, which is the driving force imparted by the wind to the wind turbine, may be lost. Solutions that provide an ability to control flow separation, i.e., diminish or delay the separation, may allow the wind turbine blades to maximize lift.

Currently, there is no efficient method to measure directly the flow fields across portions of the wind turbine blade. All fine aerodynamic rotor controls are done via loads and deflections imposed by aerodynamic forces as substitutes for direct measurement of the flow field. Moreover, there is little or no resolution finer than a whole blade. Prior measurement attempts have used flow visualizations using oil flow techniques, cameras mounted on the blade or hub, or angle of attack instruments. These short term methods, however, are not suitable for continuous use in the field as a part of an automated control system, particularly in severe or dirty operating environments and the like.

There is a desire therefore for an improved wind speed measurement techniques along the length of a blade. The use of such measurements should provide increased performance and efficiency.

SUMMARY OF THE INVENTION

The present application thus provides a wind turbine system. The wind turbine system may include a number of blades, a number of wind speed sensors positioned on the blades, a controller in communication with the wind speed sensors, and one or more performance adjustment mechanisms in communication with the controller. The controller activates the performance adjustment mechanisms in response to the wind speed sensors.

The present application further provides a method of operating a wind turbine having a number of wind speed sensors positioned along a number of turbine blades and having a number of performance adjustment mechanisms. The method includes the steps of sensing the wind speed at a number of locations along the turbine blades, developing a wind speed profile for the turbine blades, comparing the wind speed profile to an expected aerodynamic profile, and activating one or more of the performance adjustment mechanisms to compensate for a variation between the wind speed profile and the expected aerodynamic profile.

The present application further provides a wind turbine system. The wind turbine system may include a number of blades, a number of fiber optic wind speed sensors positioned on the blades, a controller in communication with the fiber optic wind speed sensors, and a yaw mechanism and a blade pitch mechanism in communication with the controller. The controller activates the yaw mechanism and/or the blade pitch mechanism in response to the fiber optic wind speed sensors.

These improvements and other features of the present application will become apparent to one of ordinary skill in the art upon review of the following detailed description when taken in conjunction with the several drawings and the appended claims.

DETAILED DESCRIPTION

Figure 1:
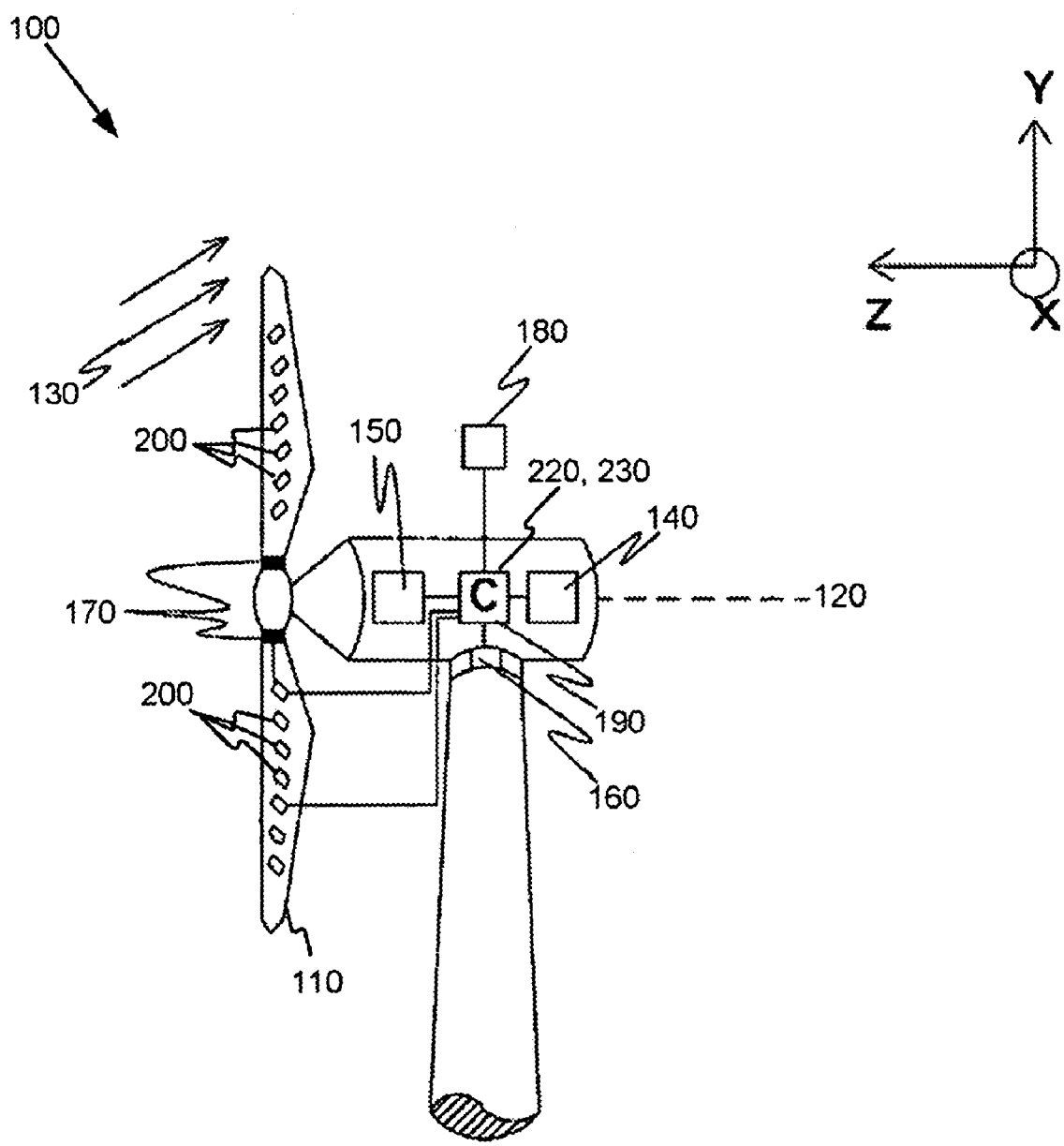
FIG. 1 is a side schematic view of a wind turbine system as may be used herein.

Referring now to the drawings, in which like numbers refer to like elements throughout the several views, FIG. 1 shows a wind turbine 100 as is described herein. The wind turbine 100 includes a number of turbine blades 110. The turbine blades 110 may have any desired size or shape. Any number of turbine blades 110 may be used. The turbine blades 110 are configured to rotate about an axis 120 with an incident wind flow such as a wind flow 130 as is shown. The axis of rotation 120 is along the z-axis and the plane of rotation of the turbine blades 110 is the x-y plane with the x-axis coming out of the plane of the paper.

The wind turbine 100 may include a wind turbine generator 140. The wind turbine generator 140 converts mechanical energy to electrical energy. The wind turbine 100 further may include a gear mechanism 150. The gear mechanism 150 provides the mechanical energy harnessed from the wind turbine blades 110 to the wind turbine generator 140. The wind turbine 300 further may include a yaw mechanism 160, a blade pitch mechanism 170, and/or other types of performance adjustment mechanisms 180. A controller 190 may be responsive to the current operating conditions of the overall wind turbine 100. The controller 190 may be coupled to the generator 140, the yaw mechanism 160, the blade pitch control mechanism 170, other performance adjustment mechanisms 180, and other devices for controlling the operation of the overall wind turbine 100. Other systems, controls, devices, and wind turbine designs may be used herein.

Figure 2:
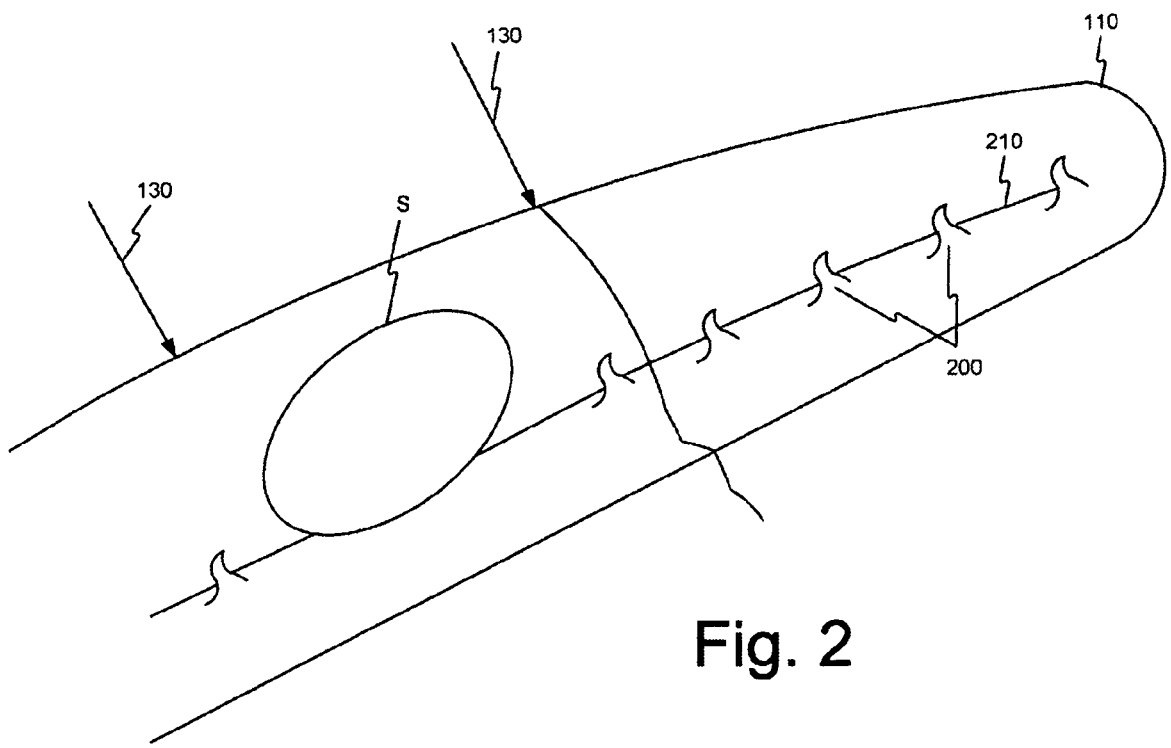
FIG. 2 is a lop plan view of airfoil blade with wind speed sensors as is described herein.

As is shown in FIGS. 1 and 2, the turbine blades 110 of the wind turbine 100 may include a number of wind speed sensors 200 positioned along a cable 210. The wind speed sensors 200 may be fiber optic sensors and the like. The wind speed sensors 200 may be positioned on or about the suction side of each turbine blade 110 along about 90 to 95% of chord or so. Other types of positioning may be used herein. Any number of wind speed sensors 200 may be used. Other types of sensors 200 may be used herein. The wind speed sensors 200 and the cable 210 may be in communication with the controller 190.

In use, the wind speed sensors 200 may develop a wind induced strain that can be measured optically and/or electronically using, for example, a fiber optic Bragg sensor or a similar type of technology. The strain may be correlated to a wind speed at the location of the particular sensor 200. Several sensors 200 may be implemented along the blade 110 such that a wind speed profile 220 for the length of the blade 110 may be measured and developed. The measured wind speed profile then may be compared by the controller 190 to an expected aerodynamic profile 230 for the given pitch angle, the rotational speed, the torque demand on the blade 110, and other parameters. The controller 190 thus may have any number of expected aerodynamic profiles 230 available. Other parameters also may be measured and considered. The wind speed profiles 220 of the other turbine blades 110 also may be compared and controlled.

By measuring the wind speed at several locations along the blade 110 and comparing this information to the expected aerodynamic profile 230, the radial location of flow separations S may be determined. Specifically, the attached flow should have a higher wind speed as compared to the separated flow. The separation S locations on all of the blades 110 may be compared by the controller 190 such that the yaw mechanism 160 and the blade pitch mechanism 170 may be activated so as to "fly out" the differences. In other words, the pitch of the individual blades 110 may be varied, the direction in which the wind turbine 100 is facing may change (yaw), the torque demand of the generator 140 may change, or combinations thereof. Other performance or operational parameters also may be varied.

For example, if flow separation is consistently seen on one side of a blade 110, the yaw mechanism 160 may be used to redirect the wind turbine 100 to minimize or eliminate this separation behavior. Balancing where the flow separates between the several blades 110 may decrease loads and increase power generation performance as well as reduce the effects of up flow angle turbulence. Once the yaw, the blade pitch, and/or other parameters have been altered, the process may repeat so as to continue to reduce or delay the separations S and to maximize overall performance.

For a given wind speed and blade fouling conditions, the controller 190 may have an expected aerodynamic profile 230 and may sense how close the actual measured wind speed profile 220 may be to the optimal expected aerodynamic profile 230. For example, when a blade 110 rotates into higher winds (due to wind shear), separation may move toward the tip of the blade 110. The controller 190 may compensate by pitching the blade 110 slightly towards a feathered position. Alternately, if all of the blades 110 face separation moving too far toward the tip, the pitch of all of the blades 110 or the torque demand of the generator 140 may be changed to improve the flow field and power output.

By detecting aerodynamic differences between the blades 110 in one instance or comparing flows during one portion of a rotation, the controller 190 may be able to "fly out" the differences among the blades 110 with the blade pitch mechanism 170. The turbine 100 may be able to tell if it is actually facing the wind so as to reduce yaw error. Such capability should increase energy capture and customer value. The same data also may be used to reduce loads on the rotor, allowing the blades 110 to be increased in area, run in higher wind classes, or reduce weight with respect to the supporting mechanical structure.

It should be apparent that the foregoing relates only to certain embodiments of the present application and that numerous changes and modifications may be made herein by one of ordinary skill in the art without departing from the general spirit and scope of the invention as defined by the following claims and the equivalents thereof.

We claim:

1. A wind turbine system, comprising:
a plurality of blades;
a plurality of wind speed sensors positioned on the plurality of blades;
a controller in communication with the plurality of wind speed sensors;
wherein the controller comprises a wind speed profile based upon an output of the plurality of wind speed sensors; and
one or more performance adjustment mechanisms in communication with the controller such that the controller activates the one or more performance adjustment mechanisms in response to the wind speed profile.

2. The wind turbine system of claim 1, wherein the one or more performance adjustment mechanisms comprise a yaw mechanism.

3. The wind turbine system of claim 1, wherein the one or more performance adjustment mechanisms comprise a blade pitch mechanism.

4. The wind turbine system of claim 1, wherein the plurality of wind speed sensors comprises a plurality of fiber optic sensors positioned along a cable.

5. The wind turbine system of claim 1, wherein the controller comprises a plurality of expected aerodynamic profiles for the plurality of blades.

6. A method of operating a wind turbine having a number of wind speed sensors positioned along a number of turbine blades and having a number of performance adjustment mechanisms, comprising:
sensing the wind speed at a number of locations along the number of turbine blades;
developing a wind speed profile for the number of turbine blades;
comparing the wind speed profile to an expected aerodynamic profile; and
activating one or more of the number of performance adjustment mechanisms to compensate for a variation between the wind speed profile and the expected aerodynamic profile.

7. The method of claim 6, wherein the step of activating one or more of the number of performance adjustment mechanisms comprises activating a yaw mechanism.

8. The method of claim 6, wherein the step of activating one or more of the number of performance adjustment mechanisms comprises activating a blade pitch mechanism.

9. The method of claim 6, wherein the number of wind speed sensors comprises a number of fiber optic wind speed sensors and wherein the step of sensing the wind speed comprises sensing a wind induced strain in the number of fiber optic wind speed sensors.

10. The method of claim 6, wherein the comparing step comprises determining areas of flow separation along one of the number of turbine blades.

11. The method of claim 6, further including determining at least one of pitch angle, rotational speed, or torque demand on the number of turbine blades.

12. A wind turbine system, comprising:
a plurality of blades;
a plurality of fiber optic wind speed sensors positioned on the plurality of blades;
a controller in communication with the plurality of fiber optic wind speed sensors;
wherein the controller comprises a wind speed profile based upon an output of the plurality of fiber optic wind speed sensors; and a yaw mechanism and a blade pitch mechanism in communication with the controller such that the controller activates the yaw mechanism and/or the blade pitch mechanism in response to the wind speed profile.

13. The wind turbine system of claim 12, wherein the controller comprises a plurality of expected aerodynamic profiles for the plurality of blades.

* * * * *